United States Patent [19]

Weber

[11] Patent Number: 4,823,067
[45] Date of Patent: Apr. 18, 1989

[54] ENERGY CONSERVING ELECTRIC INDUCTION MOTOR CONTROL METHOD AND APPARATUS

[76] Inventor: Harold J. Weber, 313 Washington St., P.O. Box 6161, Holliston, Mass. 01746

[21] Appl. No.: 155,829
[22] Filed: Feb. 16, 1988
[51] Int. Cl.$^4$ .............................................. H02P 5/40
[52] U.S. Cl. .................................... 318/799; 318/775; 318/777; 318/779
[58] Field of Search ............................... 318/771–777, 318/778, 779, 729, 799

[56] References Cited

U.S. PATENT DOCUMENTS

| | | | |
|---|---|---|---|
| 3,519,917 | 7/1970 | Martin | 323/322 |
| 4,242,625 | 12/1980 | Hedges | 318/812 |
| 4,260,947 | 4/1981 | Massey | 323/322 |
| 4,263,540 | 4/1981 | Brandt et al. | 318/775 |
| 4,361,793 | 11/1982 | Nordell | 318/729 |
| 4,382,217 | 5/1983 | Horner et al. | 318/778 |
| 4,434,394 | 2/1984 | Kellogg et al. | 318/771 |
| 4,453,118 | 6/1984 | Phillips et al. | 318/779 |
| 4,533,857 | 8/1985 | Chang et al. | 318/345 A |

Primary Examiner—David Smith, Jr.

[57] ABSTRACT

Power consumed by an ordinary a.c. induction motor is reduced by having two parallel sets of separately excited RUN windings. When the motor is lightly loaded, a.c. power feeds only one of the two RUN windings, thereby reducing the flux density in the motor stator and as a result reducing eddy current losses and copper losses. Whe the load increases, a.c. power is immediately fed to the other RUN winding thereby increasing the magnetic flux density and the motor power. The a.c. power fed to the second winding is variably controlled by a thyristor, and the amount of thyristor coupled power may be determined from sensing changes in the speed slip of the induction motor wrought by load changes. Through having the one RUN winding permanently connected with the power source, while the other RUN winding power is modulated by the phawe controlled gating action of the thyristor, less a.c. power line waveform distortion occurs due to the swamping action of the always-connected winding with the result that the effective a.c. power factor is improved. A smaller thyristor may also be used to control the motor in this manner, permitting economical energy conservation in major applliances such as washing machines, dishwashers, and refrigerators.

20 Claims, 11 Drawing Sheets

CONDUCTION ANGLE OF A.C. POWER COUPLED
WITH CONTROLLED RUNNING WINDING
HALF-CYCLE ELECTRICAL DEGREES

ENERGY CONSERVING ELECTRIC INDUCTION MOTOR CONTROL METHOD AND APPARATUS

BACKGROUND OF INVENTION

The ubiquitous use of a.c. induction motors in major appliances and air conditioning equipment is well known. The simple, inexpensive design of such motors makes their choice very cost-effective from the designers point-of-view.

Low cost fractional horsepower induction motors are also known to waste a lot of electric energy as heat and to have not particularly high operating efficiency, especially when they operate at less than full load. It is not unusual for a common induction motor to draw nearly as much line current amperage when unloaded as what it consumes under full load. Although the unloaded power factor is lower, due to the lagging current draw due to the highly inductive load characteristic, with the result that some of the apparent wasted power is "returned" to the power line by the action of the back e.m.f. of the motor, a good portion of the loss persists as a combination of eddy current heating loss brought on by relatively high magnetic field densities, combined with copper losses due to the choice of minimal wire size in the windings. These loss factors are mostly brought on by cost reduction practices of the so-called modern motor, wherein a very high temperature rise can be tolerated due to improvements made in insulating materials over the past number of years.

A motor's temperature rise is a sure sign of electrical inefficiency. All the electrical losses convert directly into heat. It is not unusual for ordinary induction motors to operate with a surface temperature of 150 to well over 200 degrees Fahrenheit. Motors made with class A insulation are commonly rated for 50 degree centigrade temperature rise above ambient, while class B insulation permits a 75 degree centigrade temperature rise. Thus a lot of energy is intentionally thrown away as thermal loss in an effort to produce a cheap product.

In most induction motor applications in major appliances, the load driven by the motor varies over a wide range. A common washing machine is often equipped with a ½ horsepower motor, such as a General Electric Company model 54KH46JR15S which draws about 7.9 amperes under full load, and with a power factor of about 85%. Since one horsepower represents 745 watts (550 ft. lb. per second), this represents a full load efficiency of merely:

$$((745W/2)/(115V \times 7.9A \times 0.85PF)) \times 100 = 48\%$$
efficiency.

As a result of this, about half of the electricity consumed by the motor under full load is thrown away as wasted heat:

$$(115V \times 7.9A \times 0.85PF) - (745W/2) = 400 \text{ watts wasted,}$$

and the manufacturer admits of a 70 degree centigrade temperature rise above ambient (e.g., about 95 degrees centigrade operating temperature).

It is also known that full load motor power is seldom required in the usual washing machine. With a heavy load of clothes, the spin dry cycle and the agitate cycle may draw nearly full power: but when washing lighter loads, nowhere near the full amount of available motor power is needed. During the pump-out cycle very little power is needed, and it is also noteworthy that during the spin dry cycle the most driving torque and therefore the highest power demand occurs during the start-up of the cycle.

The result of the variable load presented by the washing machine's ordinary operation is that the motor drive seldom operates anywhere near its full capacity. However, low-cost design practices dictate that the motor torque rating must be sized for the worst case load in order to have sufficient reserve power to run the machine without stalling.

When an induction motor is operating at less than full-load, its actual electrical efficiency is miserable. For example, the mentioned General Electric 5KH46JR15S motor continues to draw nearly 5.7 amperes under NO-LOAD conditions (e.g., load disconnected from motor shaft), which simply means that over 655 apparent watts are thrown away to do nothing! The irony is, horrible dictu, the less the motor "works", the more power the motor "wastes". Even if a power factor of as low as 64% is allowed, the wasted power $655W \times 0.64F = 420$ watts is still very high. Under no-load, practical motors seem to assume a power factor of about 70% to 80% due to eddy current loss and copper (resistance) loss. Furthermore, motors with aluminum windings suffer somewhat more loss (but "better" power factor) than those with copper windings.

The National Electric Code has given a listing of nominal load currents which may be expected to be drawn by a.c. motors running under full load, as:

| Horsepower | Single-Phase | | 3-Phase AC | | |
|---|---|---|---|---|---|
| | 115 V | 230 V | 110 V | 208 V | 277 V |
| 1/6 | 4.4 A | 2.2 A | | | |
| ¼ | 5.8 A | 2.9 A | | | |
| ⅓ | 7.2 A | 3.6 A | | | |
| ½ | 9.8 A | 4.9 A | 4.0 A | 2.1 A | 1.6 A |
| ¾ | 13.8 A | 6.9 A | 5.6 A | 2.9 A | 2.2 A |
| 1 | 16.0 A | 8.0 A | 7.0 A | 3.3 A | 2.8 A |
| 1½ | 20.0 A | 10.0 A | 10.0 A | 4.7 A | 3.9 A |
| 2 | 24.0 A | 12.0 A | 13.0 A | 6.1 A | 5.2 A |
| 3 | 34.0 A | 17.0 A | | 9.5 A | 7.1 A |
| 5 | 56.0 A | 28.0 A | | 15.9 A | 11.9 A |
| 10 | | 50.0 A | | 28.5 A | 21.4 A |

From REFERENCE DATA FOR RADIO ENGINEERS, 5th Edition, Howard W. Sams & Co.; Library of Congress No. 43-14665; page 41-13.

The principal causes for energy loss brought on by wasteful motor heating is eddy current loss in the magnetic path and "copper" loss in the windings. Cheap motors often use aluminum windings (instead of copper), and the result is even worse winding loss ("aluminum" loss!?), due to the somewhat higher resistivity of the aluminum wire. Designers often run the flux densities in the magnetic structure (particularly the stator) near saturation in order to obtain a desired level of performance with the least amount of material, and in a smaller and lighter configuration. High flux densities merely serve to aggravate heating caused by eddy current losses, and of course increased temperature aggravates the winding losses.

In the mentioned General Electric 5KH46JR15S motor, such losses due to near-saturation of the magnetic structure is very evident when the operating voltage is reduced. Yes! an unloaded induction motor can be run at much less than full rated voltage AFTER it starts, and it will continue to spin at near full speed. This particular motor runs well at 50% applied voltage under light load: and the fully unloaded (nothing connected to the shaft) current draw dips to merely about 2.1 amperes (with about 60 volts applied to the RUN winding, which is equivalent to about 1.1 amperes at full 115 line volts). Thus the wasted power becomes only about 126 watts (or merely 88 watts for a 70% PF) under no-load, whereas when it is run at the nameplate voltage the wasted power soars to about 458 watts (with 85% power factor), representing a whopping 520 percent increase in wasted energy. In this particular motor embodiment, real power waste begins to soar when the applied voltage reaches about 85 volts or so. The no load current quickly zooms up to the 5.7 ampere level when the applied voltage is increased above 90 volts up to the rated 115 volts. With 125 volts applied, the no load current jumps up to 7.3 amperes, or about 640 watts (with 70% power factor) as wasted energy! This does not mean that the motor should be run at reduced voltage except when the load is reduced, i.e. the applied motor power should be matched with the mechanical loading demand placed on the motor. It is well known that the power that an a.c. motor develops varies directly with the square of the applied voltage, and therefore a reduction to 85 volts results in a considerable reduction in available torque to be only about half that available with 115 volts applied: but even that is usually more than enough running torque for many portions of an appliance's operating cycle. Conversely, during a full-load operation of the appliance full voltage must definitely be applied, in order to avert stalling and possible burn-out of the motor. Similar performance is found with the Kenmore (Sears Roebuck & Co.) washing machine motor model C68PXDBZ3290 (part no. 62556) which is rated for ½ horsepower with a full-load current of 9.8 amperes (e.g., over 900 watts with an 80% power factor). It also appears that the =newer" a major appliancemotor design is, the more wasteful of energy it becomes when only lightly loaded.

A clothes dryer motor such as the General Electric Company model 5KH47ER150X which is rated ⅓ horsepower draws about 6.4 amperes from the 115 volt a.c. mains, hence running with about 34% efficiency when fully loaded. The same motor also continues to draw nearly 6 amperes under no load, and therefore (even with a 70% power factor), "wastes" over 480 watts of energy. It is also obvious that in a clothes dryer application, the load difference between that of drying a heavy wet blanket or two, and a different lighter load consisting of no more than a few pieces of lingerie demands considerably different torque from the drive motor. As in the earlier mentioned washing machine motor, this motor wastes significantly more energy when lightly loaded. This motor operates satisfactorily with only about 85 volts applied, albeit with less torque, and under this reduced voltage condition it draws only about 3 amperes (178 watts with 70% power factor) under no load (or a very light load), while with 60 volts applied it draws merely 2.2 amperes (92 watts with 70% power factor).

What is now shown is that the washing machine using a General Electric 5KH46JR15S or 5KH47KR223B (or equivalent) motor and the clothes dryer using a motor like the General Electric model 5KH47ER150X represent a typical laundry combination which together can readily "waste" about a kilowatt of electric power when running with less than full load. Taking into consideration that the typical laundary machine may operate for 25 to 60 minutes per day on the average, the overall amount of energy merely wasted by the cummulative energy consumption of the hundreds of millions of laundry machine operation performed each day is enormous.

The continuous duty rated Dayton model 5K461B motor produces ¾ horsepower and is intended for two-speed belt-driven exhaust fan applications. From this table of measured performance you will see that a lot of energy can be saved by reducing the motor voltage when the load is light.

| Applied RUN Winding Volts | Line Current Amps (Watts) High/Low Operating Speed | | | | Output Loading Condition |
|---|---|---|---|---|---|
| | 1,725 RPM | | 1,140 RPM | | |
| 115 | 11.0 A | 1,075 W) | 7.4 A | 723 W) | Full |
| 115 | 8.2 A | (660 W) | 7.0 A | (563 W) | None |
| 85 | 5.0 A | (297 W) | 4.5 A | (267 W) | None |
| 60 | 3.2 A | (134 W) | 3.0 A | (126 W) | None |

Assumed Power Factor: 85% full load, 70% no load.

Hence there is a whopping 802 percent difference in the amount of energy consumed (at 1,725 RPM) between full load at 115 volts and no-load, which can run just as well at 60 volts (half-voltage). More importantly, the reduction in wasted energy obtainable with no-load (e.g., light load) on the motor between the condition of full excitation and partial excitation is nearly 500 percent!

Another wasteful appliance is the common dishwasher. A ⅓ horsepower motor is commonly used, but the torque developed by the motor is only needed during short portions of each running cycle. Since the typical dishwasher motor, such as the Emerson Electric Co. industry standard type 4093, sold by the W. W. Grainger Company as their model 4K180, draws about 6.5 amperes at 3,450 r.p.m. under full load about 748 watts (or 598 watts for an 80% PF) are consumed while running with about 41% efficiency. Worse however is the consumption of about 375 watts (with 70% power factor) under no load. This wasteful performance continues throughout the machine's operating cycle even when little motor torque is needed, such as during pump-out and light-load washing.

Refrigeration equipment, and in particular air-conditioners, operate over a rather wide load range, depending upon ambient temperatures, humidity and so forth. The typical sealed refrigeration compressor unit employs an integral ¼ horsepower induction motor running at 3,450 r.p.m. and drawing about 4.0 amperes. The Kelvinator model A044-1 is such a combined 1,050 B.T.U. rated motor and compressor unit. The resulting full-load efficiency with 80% power factor is:

$$((745W/4)/(4.0A \times 117V \times 0.8PF)) \times 100 = 49.8\%$$
motor efficiency.

The lost power under full load is:

$$(4.0A \times 117V \times 0.8PF) - (745W/4) = 188 \text{ watts.}$$

It is well known that a refrigeration compressor works harder under some conditions of ambient humidity and temperature than what it does under other conditions. The compressor motor is again sized for the worst case condition to minimize the liklihood for stalling, while much of the time the motor is actually working a lesser load. The same kinds of light load inefficiencies occur in the compressor motor as were mentioned for the washing machine motor, because cheap design practices prevail and thus high magnetic flux densities and high winding current densities are allowed by the manufacturer.

Reducing the motor voltage as the compressor load decreases can save considerable energy and it can also reduce unecessary hum noise produced by the motor and as a result a more quiet and more energy efficient product results.

Reduction of the magnetic flux density in the induction motor's stator has a two-fold effect. Eddy current losses are reduced, and the inductance of the windings increases somewhat, when the magnetic path flux density is decreased. The combined effect is an increase in the impedance of the winding and a resultant lowering of current through the winding. Flux density can be reduced by increasing the amount of iron in the magnetic path, or by increasing the winding turns. For a given motor design, however the only practical method for reducing the flux density is to reduce the current flow through the winding, such as by lowering the terminal voltage. Such a simple-minded approach usually merely results in lowered motor performance and probable stalling, unless the load is also much reduced. For this reason, common motor design practice intentionally tolerates wasting a lot of energy as heat build-up in order to produce an economical, essentially cheap motorized product which has sufficient reserve horsepower or running torque to operate under the worst case load scenario. The result is that the consumer pays out in wasted electricity more than what is saved by not having a more energy efficient motor running the appliance in the first place. The most far-reaching and probably most devastating fact, however, is the enormous waste of non-renewable natural resources this usual kind of cheap and low efficiency motor engineering incurs.

SUMMARY

A.c. induction motors afford a very economical and time proven source of power for driving major appliances, air conditioners, and other kinds of domestic and commercial machines. The dependability of induction motors is exceptional, and years of product engineering have resulted in a simple and cost effective configuration using few parts.

Production of electric power in America is reaching a point where the utility companies in many parts of the country will soon be nearing 100% capacity. Unless more generating capacity is soon built, brown-outs, power grid failures, and other cataclysmic power distribution events are likely to occur because no reserve power capacity is available.

The unecessary waste of electrical energy can be reduced through improved utilization of whatever electricity is now used for operating major appliances, air conditioners, and other kinds of common machines. The ordinary a.c. induction motor is notorious for being inefficient, as evidenced by the high temperature rise inherent in any common motor. Since most motors operate at least part of the time with much less than full load, it behooves the designer of a modern product to somehow adapt the motor to match the dynamics of the load and thereby waste less energy. Any appliance which is trully energy efficient will soon have to have a better match between the driving motor and the load under all conditions of loading.

A.c. induction motors could be supplanted by other kinds of drives such as "brushless" d.c. motors. However, quick changeover to an alternate motor design is unlikely, due to the long and proven product history of a.c. induction motors. The induction motor has become so highly refined in mechanical design that it is unlikely that any other contender will soon even approach the economics of that design in the bigger appliance sizes, say from ¼ horsepower and up.

The most surprising improvement that can be implemented with the common induction motor design involves mere modification of the motor winding procedure to include two parallel RUN windings. The first RUN winding is sized with turns and wire guage selected to produce just sufficient magnetic field to meet the running needs of the motor under its lead-load condition, while the second RUN winding is in a like way sized with turns and wire guage to provide additional magnetic field such that when it is directly in parallel with the first RUN winding, the two combine to meet the running needs of the motor under full-load. The actual improvement is obtained through the expedient of connecting the first RUN winding directly with the source of a.c. power, while the second RUN winding is modulated with more or less of the available a.c. power depending upon instantaneous motor loading. For example, under minimum load only the first RUN winding is excited, and the flux density in the motor is relatively low thereby reducing the eddy current losses. As the load increases, a controller increases the second RUN winding excitation in proportion and the motor stator magnetic field density is always maintained at a level which is just sufficient to provide the needed rotational torque in the rotor.

In my earlier application Ser. No. 07/075,990 ("Electric Induction Motor Power Control Method and Apparatus") I taught the variable control of the a.c. power connected with a singular RUN winding of an a.c. induction motor as a way to obtain energy conversation under less than full load conditions. This earlier controller effectively varied the applied RUN winding power with a phase controlled thyristor, with the result that during at least part of each a.c. power half-cycle no electrical energy was coupled with the winding (excepting, of course, under condition of full load), with the result that no magnetic flux was produced in the motor field during that part of the a.c. power half-cycle. The turn-ON of the thyristor at some later point during the power half-cycle then abruptly turned the RUN winding power on, with the delay being related with the instantaneous loading of the motor. The distortion of the a.c. current waveform cycle brought forth by such abrupt turn-ON of current presented a load having a poor power factor to the a.c. source. Current rush caused by sudden thyristor firing can produce spiking, and of course a considerably larger thyristor device is needed to handle the full motor current. In this earlier invention, I utilized the "slip" in speed which is related to loading in the common induction motor as a signal for setting the control parameters. This is a sensitive and instantaneous reflection of motor loading, and is therefore applicable in part with my present invention.

Through the use of two RUN windings, with one permanently excited by the a.c. source I now achieve less distortion of the a.c. power current waveform as seen by the a.c. source, and superior control of the motor's performance. The magnetic path in the motor (i.e., the stator) is always excited to the extent needed for the minimum load condition (or at least a lessened load condition), whereas the controller merely adds to this initial magnetic excitation to the extent needed to produce increased and perhaps full power capability from the motor. The result is that the abruptness of current change caused by thyristor firing is very considerably lessened, and the current flow in the first RUN winding which precedes the firing of the thyristor that excites the second RUN winding serves to somewhat swamp the deleterious effect of abrupt current switching the by the thyristor. A smaller thyristor can also be used to switch power to the second RUN winding, since it draws a lesser portion of the total running current of the motor.

Through the expedient of modifying an ordinary motor, like a ⅓ horsepower General Electric model 5KH42ER355S design and using essentially the same design "factors", results in the winding of a first RUN winding for a calculated voltage rating of 150 volts, and then actually operating it on 115 volts. This design modification results in the desired operational equivalence of having reduced the power applied to the original 115 volt winding to about 88 volts. The immediate result is that of greatly reducing the no-load current draw, to about 1 ampere or less (i.e., about 80 watts with a 70% power factor). The second RUN winding is then added to the stator to be physically as well as electrically in parallel with the first RUN winding. The calculated sizing of the second RUN winding number of turns and wire guage is such that under FULL load, the total magnetic flux present in the stator as provided by the two RUN windings being coupled in parallel is established to be about equivalent to that of the unmodified motor when its sole RUN winding was connected directly with the 115 volt power source. The field produced by the second RUN winding is usually a lot stronger than that produced by the first RUN winding when the motor is operating near full load.

An objective of my invention is to provide an energy efficient induction motor having improved electrical operation, and less energy waste, under any condition of less than full load.

It is another objective of my invention to enable practical implementation of energy efficiency improvements in the electrical performance of induction motors having ordinary physical design merely through the modification of the RUN winding portion of the motor structure.

Still another objective for my invention is to provide just enough magnetic flux in the motor field to produce the rotating member torque necessary to sustain satisfactory motor performance under various amounts of loading.

A further objective is to teach the use of a novel induction motor having more than one RUN winding, whereby during motor operation one of the windings continuously draws a.c. current from the power line while the other RUN winding is variously modulated with a.c. power in prompt response to any changes sensed in motor loading.

Still another objective is to provide control of the induction motor's applied power over a range, between that of minimum load and full load, in order to reduce power consumption, while providing such energy efficient control of the motor with semiconductor devices having smaller power rating size than ordinarily needed.

Yet another objective is to provide a motor controller that immediately senses any change in the rotational speed slip of the motor and therefrom derives a control signal which modulates the power applied to the second RUN winding, whereby an increase in slip results in an immediate increase in power coupling with the second RUN winding.

The instantaneous sensing of changes in rotational speed slip of the motor serves to provide a fundamental performance signal which can serve to signal how much applied RUN winding power is needed for the motor's satisfactory operation, with the objective being that less load results in less speed slip which results in a reduction in a.c. power coupling with the motor and a significant reduction of electrical energy waste.

An important objective of my invention is that of introducing art which will show existing motor designs can be merely modified by the manufacturer to advantageously include the significant improvements in energy conserving performance, without necessitating any further cost for re-tooling or the like.

These and other advantages of my invention will now be revealed to the skilled artisan, and it is anticipated that applications for and ways of using the elements of my invention will vary from those which are now presented herewithin, since my examples are given merely for the illustrative purpose of providing a clear understanding of the underlying essence of my invention. Such broader application of my invention's teachings to benefit other commonplaces usages for induction motors shall also be deemed to be obvious to any practicing artisan and within the general scope of my invention's reading.

DESCRIPTION OF DRAWINGS

Eleven sheets of drawings showing twelve figures serve to illustrate the substance of my invention.

DESCRIPTION OF MY INVENTION

Figure 1:
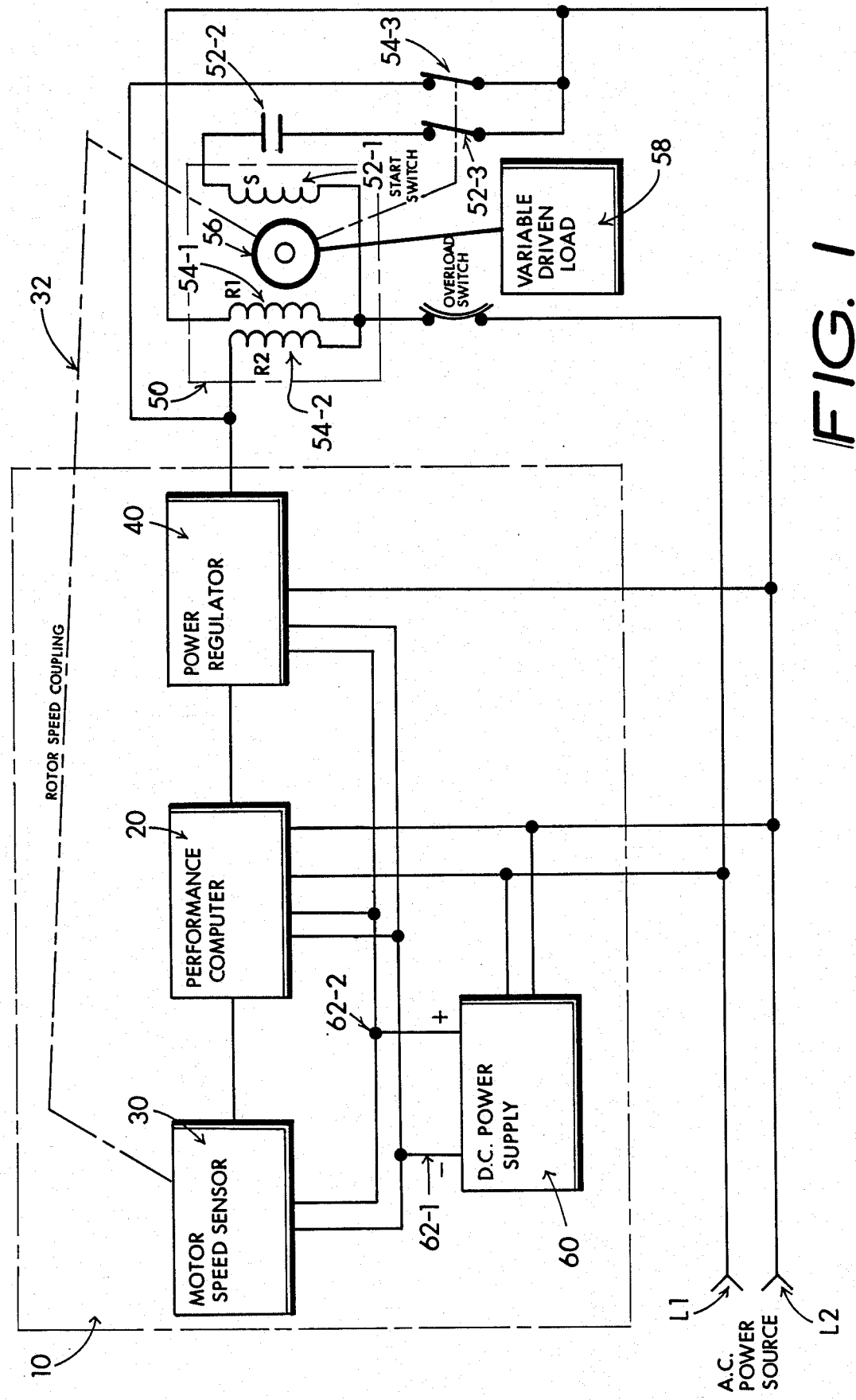
FIG. 1 Block diagram showing a motor having two RUN windings, one of which is variably controlled in response to motor load variation.

My invention provides for the energy-efficient operation of ordinary a.c. induction motors through the modulation of the magnetic flux in the field (or stator) of the motor in response to variations in loading of the motor. Such load variation has been found to be instantly measurable through the expedient of sensing any even small variation in the sub-synchronous motor speed slip which is characteristic of all common types of induction motors. In FIG. 1 I show a controller 10 which includes a performance computer 20 having circuits which compare the instant motor speed signal, as provided from the speed sensor 30, with other predetermined parameters. The sensor 30 is coupled 32 with the rotor 56 of the induction motor 50 to measure the motor's instant speed. The functional elements which make up this performance computer 20 portion of the invention work together to set the instant effective value of the power control signal which couples with the power regulator 40. The power regulator produces a variation in the amount of a.c. power coupled with the power line L2. The other RUN winding 54-1 (R1) is directly coupled with the a.c. power source and therefore provides constant excitation so long as a.c. power is applied.

The induction motor 50 also includes a START winding 52-1, a starting capacitor 52-2 and a starting switch 52-3 which may be a usual kind of centrifugual speed responsive set of contacts, coupled with the motor's rotor 56 which is closed at rest, and which opens when the motor attains a substantial speed of about 70% or so of FULL speed. Another initially closed contact set 54-3 also serves to shunt the a.c. line L2 directly with the second RUN winding during the starting period, thereby producing full starting torque from the motor and bypassing the initial current surge around the power regulator thereby allowing for a smaller, more economical thyristor to be used in the power regulator. The variable load 58 is driven by the rotor 56, and may undergo a wide fluctuation in instant torque demand such as that produced by appliances like washing machines, or by the compressor in a refrigeration or air conditioning system.

Figure 2:
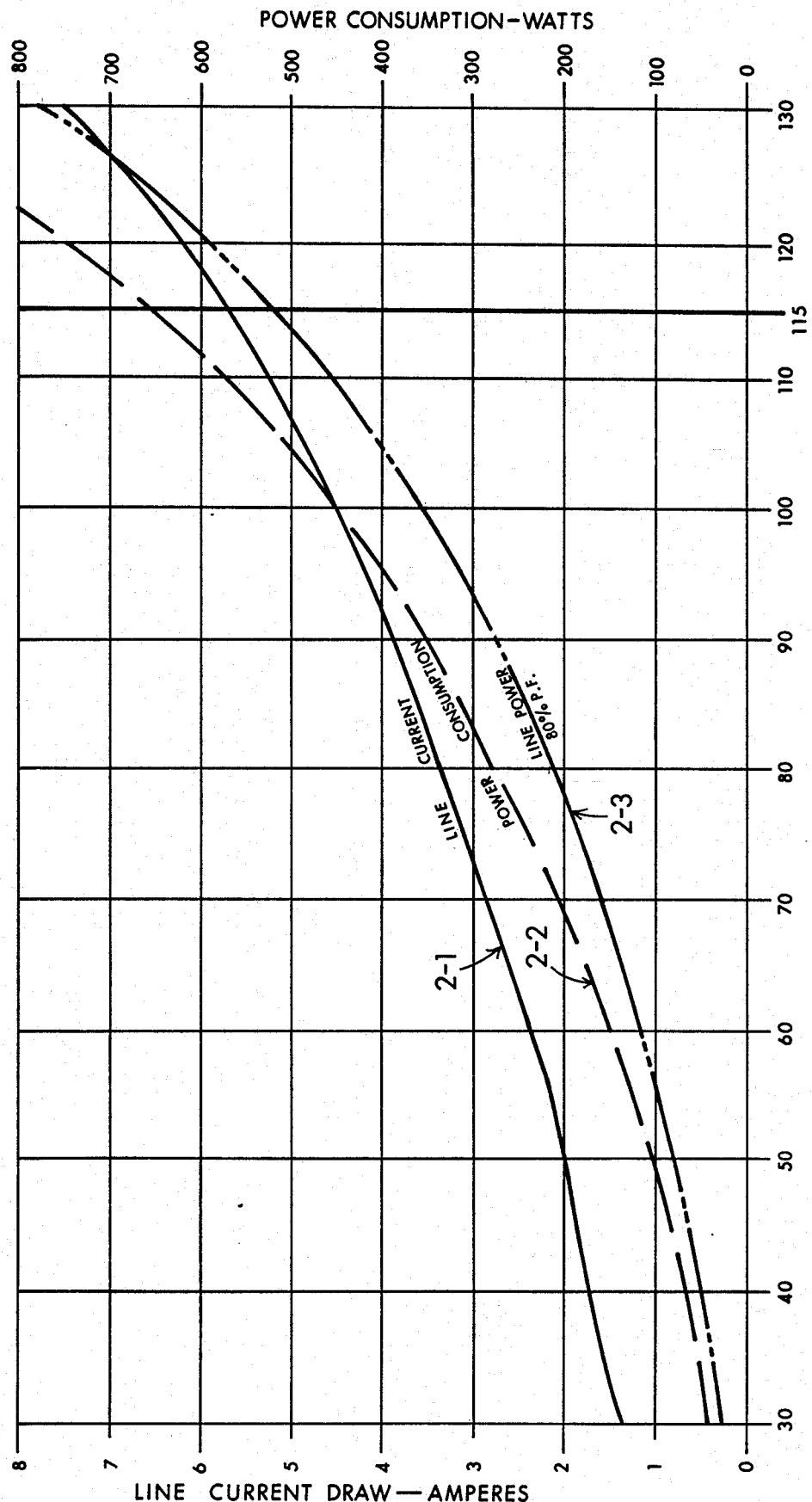
FIG. 2 Plot showing NO-LOAD line current and power dissipation for a typical induction motor relative with applied voltage variation.

A.c. power consumption for an induction motor of common design is depicted in the plot of FIG. 2. With curve 2-1 I show how an ordinary $\frac{1}{3}$ horsepower split-phase induction motor, such as the General Electric type 5KC45HR1S, which uses about 6.8 amperes of 115 volt a.c. power under FULL load still continues to draw about 5.7 amperes of 115 volt a.c. power under NO load, resulting in the WASTE of about 458 watts (with 70% power factor). My curve 2-2 also show how dramatically the NO-LOAD energy consumption drops off as the applied a.c. line voltage is reduced (not including power factor correction). Since the mechanical power that an induction motor develops varies in direct relationship to the square of the applied voltage, 85 volts represents about half-power. My curve 2-3 also shows that for 85 volts about 3.7 amperes is consumed, with the wasted power reduced to about 252 watts if corrected for 80% power factor while operating with about half-load. I have found that for a condition of essentially NO-load (or a very light load) the a.c. voltage can be reduced still further to about 57 volts (e.g., half-voltage) and the motor still spins at about the same speed and continues to produce quite a bit of torque, on the order of 1/12 horsepower: but a remarkable reduction in energy consumption is obtained, with only about 98 watts (under 70% power factor) being drawn from the a.c. power line (less than even that shown by the 80% power factor curve 2-3). This is a whopping 470 percent DECREASE in energy consumption! While it is recognized that motors do not typically run without load, it must also be realized that in most everyday applications for motors, they are often so over-sized that they also do not usually run under full load during most of their typical operating cycle.

Figure 3:
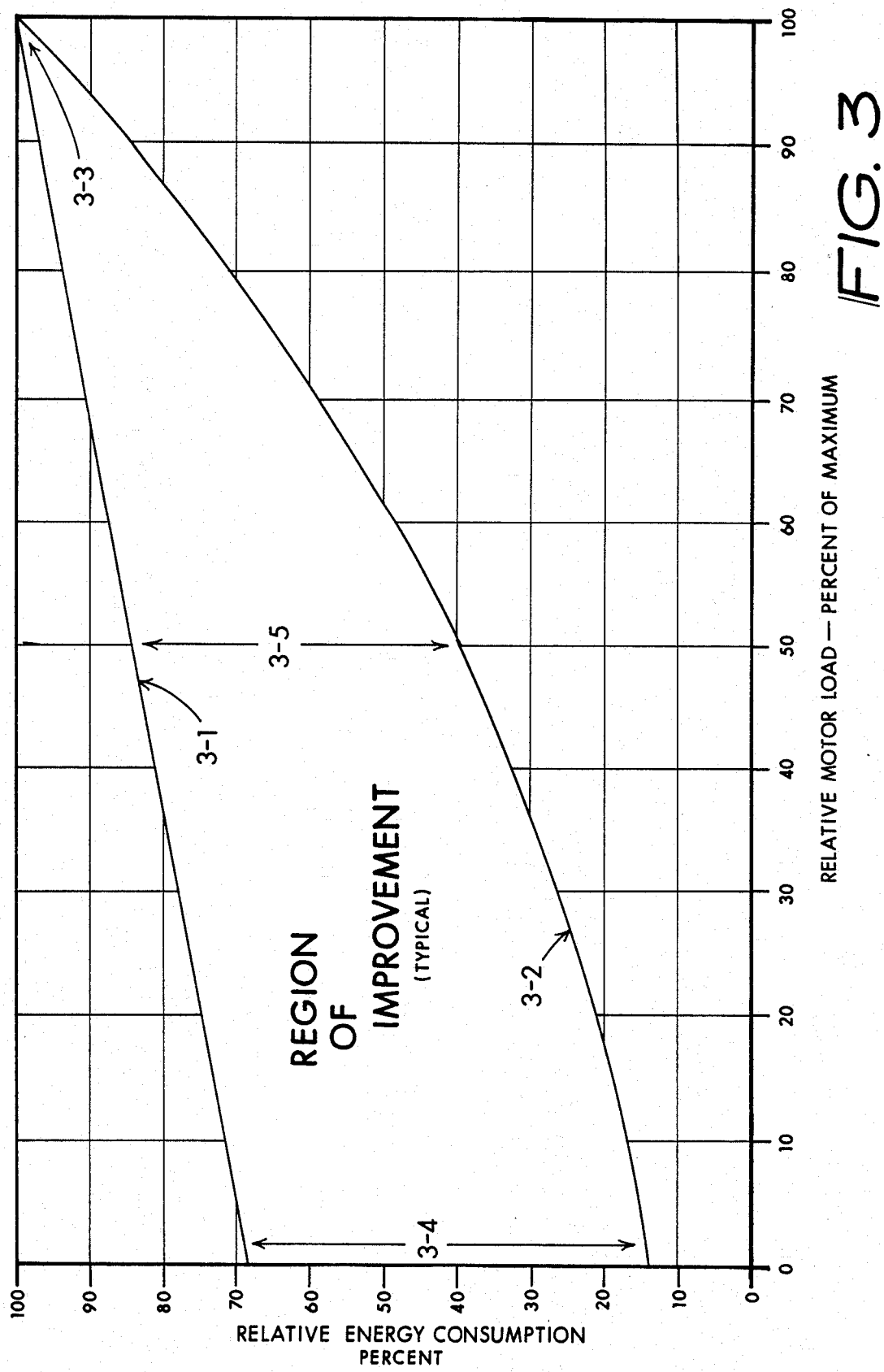
FIG. 3 Plot showing improvement in energy saving obtained through the use of the invention with a conventional motor design having a wide variation in loading.

The improvement afforded by my invention is depicted in the plot of FIG. 3. Under different conditions of loading, the ordinary motor's performance is depicted by the curve 3-1, which shows that under FULL load (location 3-3) 100% power is drawn from the a.c. line. As the load decreases to essentially NO-LOAD (e.g., 0% loading) about 68% power continues to be drawn as wasted energy. Curve 3-2 depicts the dramatic improvement which my invention produces: under NO-LOAD, power consumption drops to a mere 14% of FULL-LOAD. That is 485% less power than what the un-controlled motor consumes. You will also see that, with 50% motor load, I obtain about 218% reduction in energy consumption, as depicted between locations 3-5 on the curves.

Figure 4:
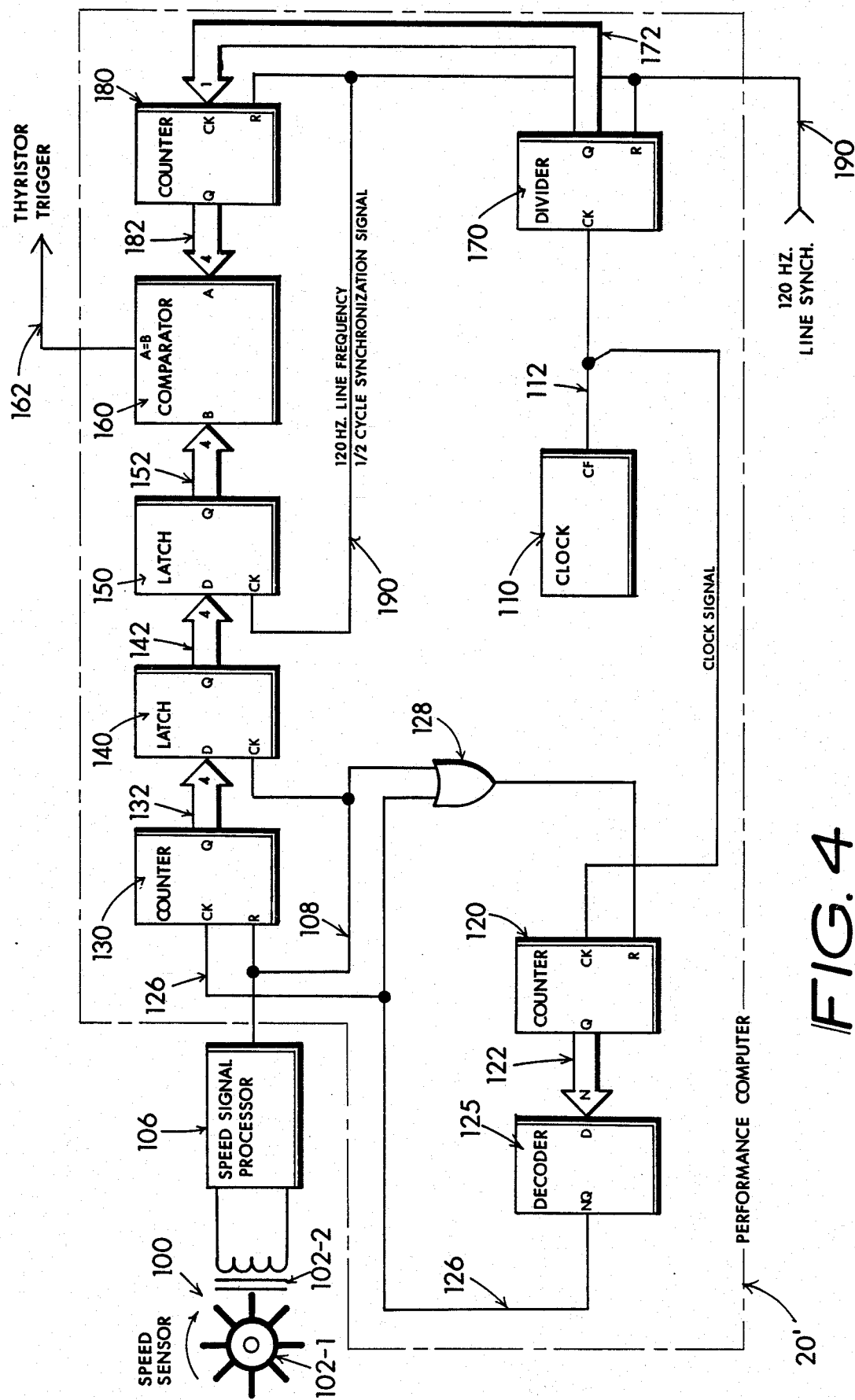
FIG. 4 Block diagram for elements which make up a performance computer suitable controlling the power coupled with an induction motor.

In FIG. 4 I show how the speed of the motor is sensed and used to trigger a thyristor in order to vary the power in response to load changes. The speed sensor 100 includes a magnetic rotor 102-1 and a pickup coil 102-2. The rotor 102-1 may mount on the motor output shaft where it is spun by the motors rotation. I have found that the electronic ignition rotor and pickup such as used on the 1978 Chrysler Corporation V-8 engine made a good, inexpensive and easy to implement sensor for my experimental model. On the typical motor, the ignition pickup rotor can mount directly to the $\frac{1}{2}$-inch shaft by using a bushing, and the pickup assembly can then be affixed directly to the motor faceplate. Having been designed for automotive application, such a pickup is not only cheap and predictable in performance, but also reliable and impervious to dirty environment.

Eight pulses are produced by the speed sensor pickup coil 102-2 for each motor shaft rotation. The pulses are amplified and converted into pulses by the speed signal processor 106, resulting in a stream of pulses on signal line 108. In the particular signal processing logic architecture which I show as my performance computer 20', a clock signal source 110 provides a pulse signal on the signal line 112 which goes to the clock CK input of a counter 120 (such as a CD-4020B). The counter output then couples with a decoder 125 that produces a decoded signal 126 which couples through OR gate 128 to RESET the regularly reset the counter 120. The result of the combination is a divide-by-n function, with the periodic pulse on line 126 also coupled with the CLOCK input of a 4 stage (e.g., divide-by-16) counter 130. The determination of the preferred clock frequency and the necessary count-factor 'n' of the divider 120 can be quickly determined from the following short BASIC computer program routine, when the MINIMUM and the MAXIMUM motor speed is entered together with the number of pulses produced by the speed signal processor 106 for each motor shaft rotation.

ing conditions specified by running the aforesaid program will show:

| | COMPUTATION BASED ON 16 MOTOR SPEED STEPS (SPEED SUB-DIVISIONS) | | | |
|---|---|---|---|---|
| STEP No. | DIVISION FACTOR | SPEED RPM | SPEED PULSES/S | © Harold J. Weber Feb. 1988 K1VTW |
| 0 | 602 | 1740 | 29 | |
| 1 | 603 | 1737 | 28.952 | CLOCK FREQ = 139819 HERTZ |
| 2 | 604 | 1734 | 28.9041 | |
| 3 | 605 | 1731 | 28.8564 | UPPER SPEED = 1740 R.P.M. |
| 4 | 606 | 1729 | 28.8088 | |
| 5 | 607 | 1726 | 28.7614 | LOWER SPEED = 1695 R.P.M. |
| 6 | 608 | 1723 | 28.7141 | |
| 7 | 609 | 1720 | 28.667 | SENSED PULSES = 8 per REV. |
| 8 | 610 | 1717 | 28.6201 | |
| 9 | 611 | 1714 | 28.5733 | Ckf/1,920 Hz = 73 Div. Factor |
| 10 | 612 | 1712 | 28.5267 | |
| 11 | 613 | 1709 | 28.4802 | |
| 12 | 614 | 1706 | 28.4338 | Computations are based upon |
| 13 | 615 | 1703 | 28.3877 | having 16 speed steps. |
| 14 | 616 | 1700 | 28.3416 | |
| 15 | 617 | 1698 | 28.2957 | ERROR LESS THAN .16 Percent |

The division factor for the counter is then the "STEP No. 0" DIVISION FACTOR value (e.g., 602). The additional division factor values DF are the sum of this value with the division factor effected by the states $D_n$ of the counter 130; shown by:

```
10    ' >COMPUTATIONS FOR DIVIDER STATES RELATIVE WITH R.P.M. RANGE OF MOTOR<
20    ' > © Harold J. Weber 2/88      Digital VT-180   M-BASIC   CPM/80<
30    GOSUB 440;GOSUB 450
40    PRINT:PRINT "ENTER UPPER R.P.M. VALUE:";:PRINT TAB(35);
50    INPUT SH
60    PRINT:PRINT "ENTER LOWER R.P.M. VALUE:";:PRINT TAB(35);
70    INPUT SL
80    IF SL<>INT(SL) OR SH<>INT(SH) OR SH-SL>.25*SH THEN GOTO 30
90    PRINT:PRINT "HOW MANY SENSED PULSES":PRINT "   PER MOTOR ROTATION?"
100   PRINT TAB(35);:INPUT NP
110   IF NP>50 OR NP<1 OR NO<>INT(NP) THEN 90
120   SD#=(1/SL/60))-1/SH/60))
130   FCK#=(1/SD#)*16:FCL=FCK#*NP
140   IF FCL/1920>INT(FCL/1920)+.5 THEN DVK=INT(FCL/1920)+1 ELSE DVK=INT(FCL/1920)
150   DVA#=FCK#/(SH/60):DVB=INT(DVA#)
160   GOSUB 440:GOSUB 460:PRINT;
170   PRINT "COMPUTED LISTING OF VALUES FOR MOTOR CONTROLLER"
180   PRINT STRING$(80,45):PRINT "   STEP";:PRINT TAB(10) "DIVISION";
190   PRINT TAB(22) "SPEED";:PRINT TAB(34) "SPEED";:PRINT TAB(44) "|";
200   PRINT TAB(58) " © Harold J. Weber"
210   PRINT "   No.";:PRINT TAB(11) "FACTOR";:PRINT TAB(23) "RPM";
220   PRINT TAB(33) "PULSES/S";:PRINT TAB(44) "|";
230   PRINT TAB(58) "Feb. 1988      K1VTW"
240   PRINT STRING$(43,45);:PRINT "|";: PRINT STRING$(34,45)
250   FOR A=1 TO 16
260   SPE=(FCK#/DVA#)*60:PSR=SPE/60
270   IF SPE-INT(SPE)>.5 THEN SPD=INT(SPE)+1 ELSE SPD=INT(SPE)
280   IF SPE>SL THEN PCT=((SPE-SL)/SL)*100 ELSE PCT=((SL-SPE)/SL)*100
290   PCT=INT(PCT*100)/100
300   PRINT TAB(3)STP;:PRINT TAB(11) DVB;:PRINT TAB(21) SPD;
310   PRINT TAB(32) PSR;:PRINT TAB(44)"|";
320   IF A=2 THEN PRINT TAB(47) "CLOCK FREQ. ="FCL"HERTZ"
330   IF A=4 THEN PRINT TAB(47) "UPPER SPEED ="SH"R.P.M."
340   IF A=6 THEN PRINT TAB(47) "LOWER SPEED ="SL"R.P.M."
350   IF A=8 THEN PRINT TAB(47) "SENSED PULSES ="NP"per REV."
360   IF A=10 AND DVK=>1 THEN PRINT TAB(47) "C.F./1,920 Hz ="DVK"Div. Factor"
370   IF A=12 THEN PRINT TAB(47) "Computations are based upon"
380   IF A=14 THEN PRINT TAB(47) "having 16 speed steps."
390   IF A=15 THEN PRINT TAB(45) STRING$(36,45)
400   IF A=16 THEN PRINT TAB(47) "ERROR LESS THAN "PCT"PERCENT"
410   DVA#=DVA#+1:DVB=DVB+1:STP=STP+1
420   NEXT A
430   PRINT STRING$(80,45):END
440   PRINT CHR$(27)"[2J";:RETURN        '> Clear Sreen
450   PRINT CHR$(27)"[10;1H";:RETURN     '> Home Cursor
460   PRINT CHR$(27)"[1;1H";:RETURN      '> Home Cursor
```

Thus, for example, if a motor speed is set for a no-load of 1740 r.p.m., and a full-load of 1695 r.p.m., the result- $$DF = 602 + Dn.$$

The output 132 of the counter 130 couples with the DATA inputs of a latch 140. The CLOCK input of the latch is coupled with the pulse signal on line 108, with the result that the latch 140 grabs and holds the states present on the counter 130 just prior to RESET of the counter. Since the frequency of the clock, and the division factor of the counter 120 has been predetermined (such as by the preceding computer program) to have such a relationship with the actual motor speed that some number of pulses on line 126 will advance the counter state 130 whereby the output state of the counter will represent instant motor speed. The latched data on bus 142 then couples with the DATA input of another latch 150, which is clocked in synchronization 190 with the 120-hertz a.c. line frequency. The result is that the data stored in latch 140 will transfer to the output 152 of latch 150 each a.c. power half-cycle. The latch signal 152 couples with the "B" input of a comparator 160, such as a CD4085.

and the B input of the comparator are of the same binary weight, the A=B output producess a pulse which may couple 162 with a thyristor to turn the a.c. power ON at some belated point in each a.c. power half-cycle.

The operation of the comparator 160 in conjunction with the counters 140, 180 and latch 150 as a means for developing a phase-delayed thyristor gate control signal can be further reviewed in an old publication "Three ICs Control Triacs Digitally" by Julian Bryttan in the June 24, 1981 edition of EDN Magazine, page 192. While a 74193 UP/DOWN counter is used, it provides in my FIG. 4 and therefore shows that the obtaining of a.c. motor power control through this kind of digitally programmed a.c. power half-cycle phase delay as being well known in the art.

Figure 5:
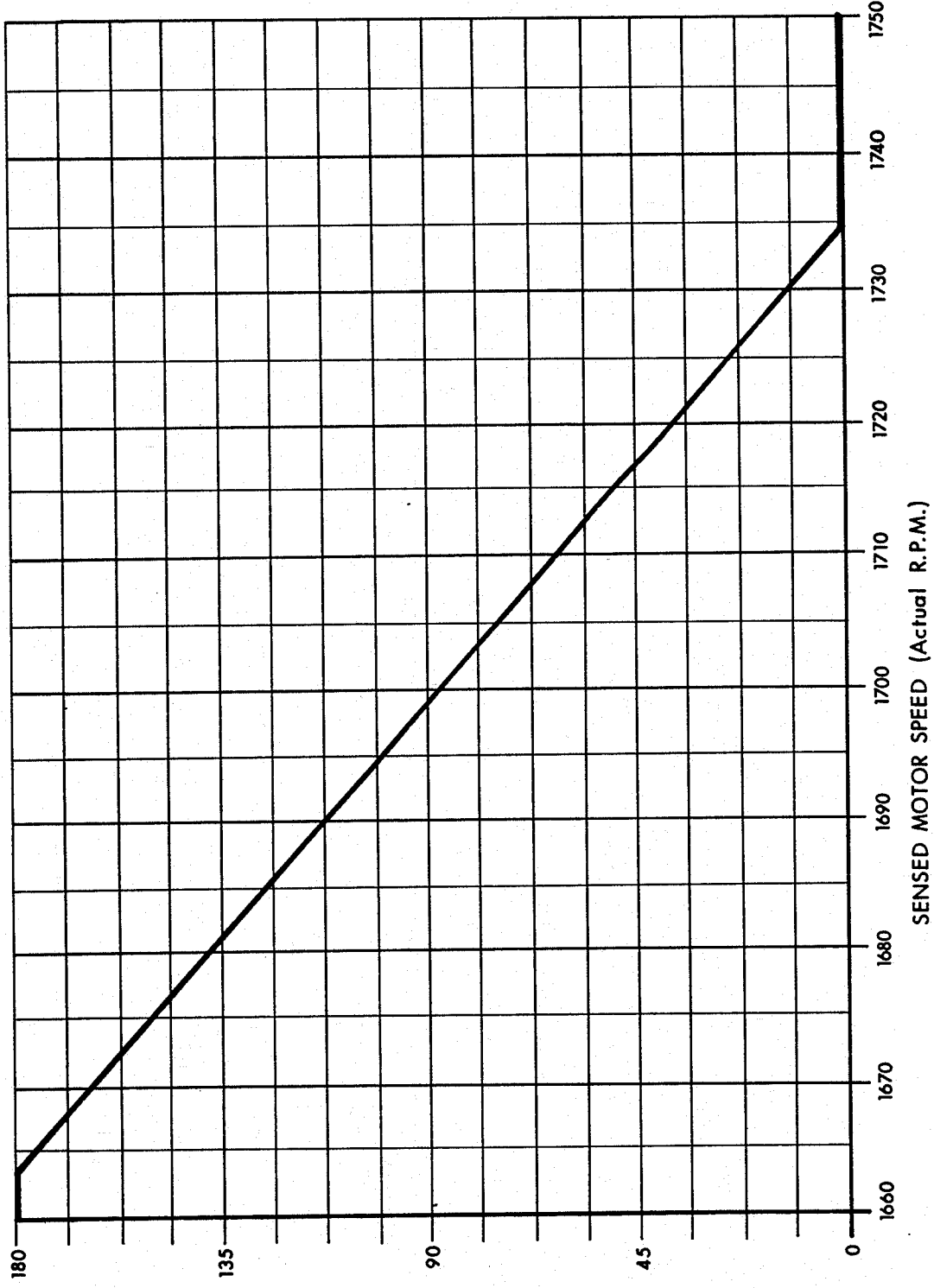
FIG. 5 Plot showing changes in the a.c. power conduction angle produced by the thyristor trigger drive signal provided by the circuit of FIG. 4 relative with sensed motor speed.

In the plot of FIG. 5 I have shown the performance of the controller of FIG. 4 using a set of parameters where the upper (unloaded) motor speed is selected as 1734 RPM and the lower (full load) motor speed is selected as 1663 RPM. Under these conditions, the computed values are:

| STEP No. | DIVISION FACTOR | SPEED RPM | SPEED PULSES/S | COMPUTATION BASED ON 16 MOTOR SPEED STEPS (SPEED SUB-DIVISIONS) © Harold J. Weber Feb. 1988 K1VTW |
|---|---|---|---|---|
| 0 | 374 | 1734 | 28.9 | |
| 1 | 375 | 1729 | 28.8231 | CLOCK FREQ = 86644.7 HERTZ |
| 2 | 376 | 1725 | 28.7466 | |
| 3 | 377 | 1720 | 28.6705 | UPPER SPEED = 1734 R.P.M. |
| 4 | 378 | 1716 | 28.5948 | |
| 5 | 379 | 1711 | 28.5195 | LOWER SPEED = 1663 R.P.M. |
| 6 | 380 | 1707 | 28.4446 | |
| 7 | 381 | 1702 | 28.3701 | SENSED PULSES = 8 per REV. |
| 8 | 382 | 1698 | 28.296 | |
| 9 | 383 | 1693 | 28.2222 | Ckf/1,920 Hz = 45 Div. Factor |
| 10 | 384 | 1689 | 28.1489 | |
| 11 | 385 | 1685 | 28.0759 | |
| 12 | 386 | 1680 | 28.0033 | Computations are based upon |
| 13 | 387 | 1676 | 28.9311 | having 16 speed steps. |
| 14 | 388 | 1672 | 28.8593 | |
| 15 | 389 | 1667 | 28.7878 | ERROR LESS THAN .25 Percent |

The clock signal 112 also couples with the clock input of another frequency divider 170, which is set to produce pulses having about 1,920 hertz rate on the output 172. The divider 170 division factor may be determined quickly from the clock frequency CKf by:

$$F = CKf/(120 \times 16) = CKf/1920$$

where: CKf=hertz
and for the previously shown typical clock frequency of 139,819 hertz, the division factor F becomes:

$$F = 139,819/1920 = 72.822395 = 73$$

and therefore:

$$139,819/73 = 1915.3287 \text{ Hz}$$

which is close enough (within 0.24%) to 1920 Hz for practical purposes.

The 1920 Hz (viz 1915.3287 Hz) signal from the divider couples with the CK input of the 4-stage counter 180 (such as ½ CD4518B). Since the counter is RESET from the 120 Hz line synch signal 190 the counter output advances 16 states (from binary 0000 to binary 1111) between each reset. The advancing states, which in effect are time related with the a.c. waveform so as to divide each a.c. half-cycle into 16 portions, couple with the "A" input of the comparator 160. Whenever the A Showing that the division factor of the counter 120 is 374 and the slope of the curve on the plot represents the essentially linear relationship between sensed motor speed and the a.c. power conduction angle in electrical degrees. The artisan will realize however that although the electrical degree portions are equal, with each step portion being of about 180/16=11.25 degrees, duration, the actual power applied to the motor is not divided into such uniformly equal steps since the a.c. (half-cycle) waveform is usually sinusoidal and therefore the greater step-by-step power changes occur over the mid-portion of the range. The necessary division factor F for the frequency divider 170 can be quickly determined as:

$$F = 86,644.7 \text{ Hz}/1920 = 45.1275 = 45$$

and thus the actual rate of the signal from the divider 170 is:

86,644.7 Hz/45 = 1925.44 Hz (e.g., only about 0.28% high).

The division factor F may also be quickly determined for any motor speed range combination (and resulting clock frequency) by running the shown computer program.

Figure 6:
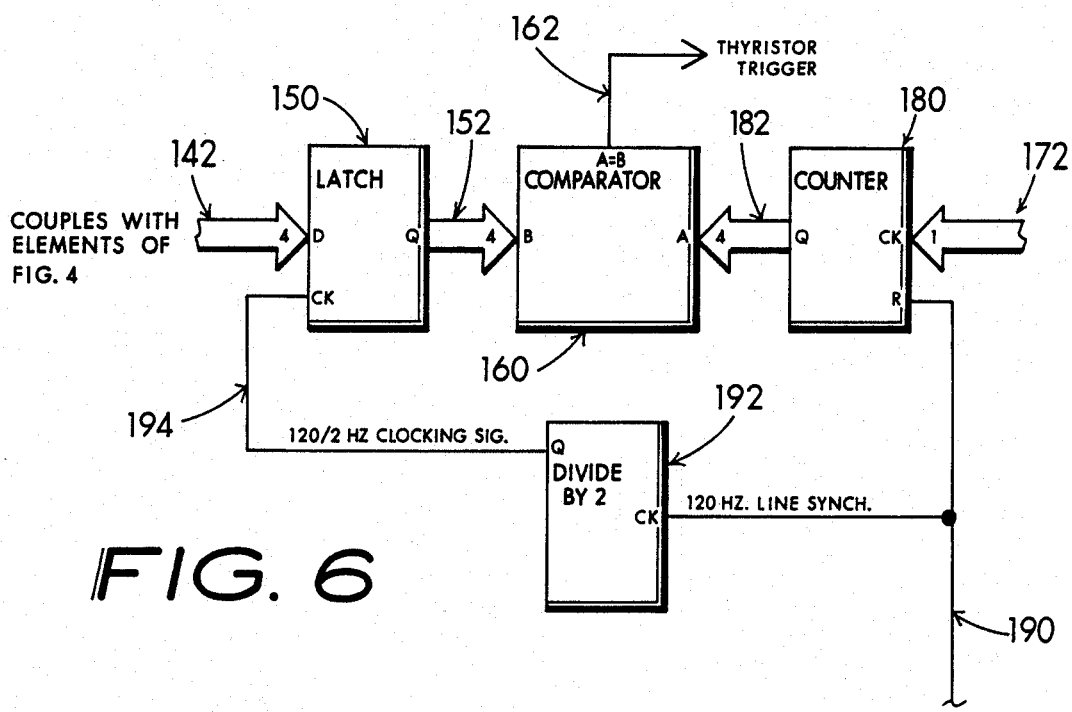
FIG. 6 Additional circuit which cooperates with the elements of FIG. 4 to obtain integral cycle power variation control.

Integral cycle control of power modulation to the second RUN winding of the motor may be accomplished with the additional circuitry of FIG. 6, when applied to the earlier teaching of FIG. 4. Inclusion of a divide-by-2 counter 192 serves to cut the operating rate of the 120-hertz "line synch" signal in half, which couples with the edge triggered CK input of latch 150. The operational result is that the value set in latch 150 will serve to remain the same for two successive half-cycles. The improved symmetry reduces imbalance in the r.m.s. current drawn by the motor windings and better a.c. power line utilization (e.g., better apparent power factor).

Figure 7:
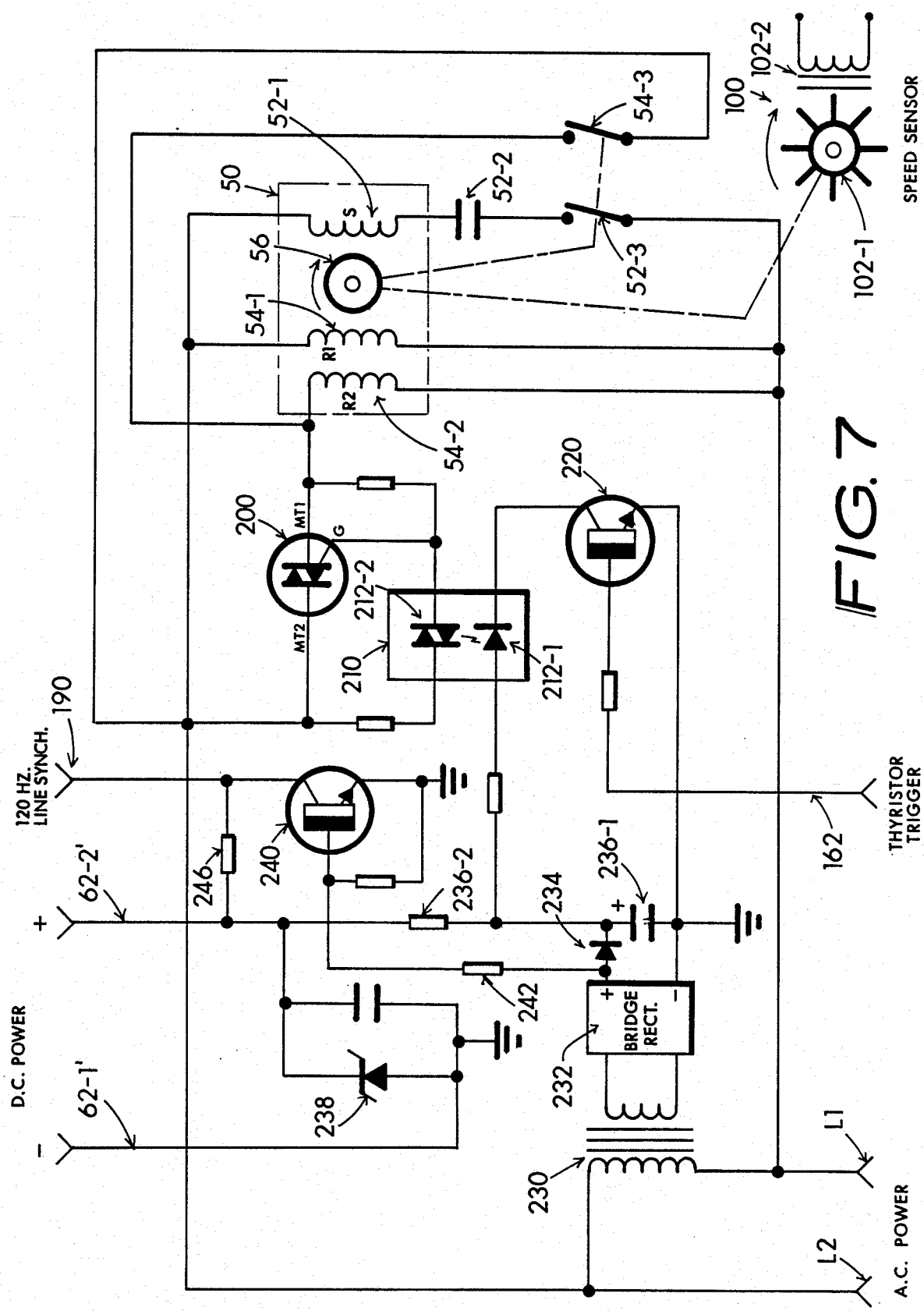
FIG. 7 Hookup for a variable power switch using a thyristor suitable for driving the RUN winding of an induction motor from the control circuitry of FIG. 4.

The thyristor trigger signal produced by the comparator 160 of FIG. 4 couples via line 162 with the base of NPN transistor 220 in the power switching circuit of FIG. 7. The HIGH trigger pulse turns the transistor ON and the collector draws current through the light emitting diode 212-1 portion of the optocoupler (such as a Motorola MCP 3010). The trigger diode portion of the optocoupler is thusly turned ON, resulting in current flow between the MT-2 terminal of the triac 200 through the resistor 214 and the triac gate. A.c power then flows through the triac 200 from the line input L2 to R2, the second RUN winding 54-2 of the motor. Thus the magnetic flux produced in the motor stator by the fully connected first RUN winding 54-1 is added to by the triac modulated field produced by the second RUN winding.

Start-up of the motor is produced in the usual way by the START winding 52-1. A capacitor 52-2 may couple through the starting contacts 52-3 which are normally closed when the motor is not running. Another contact set 54-3 is also arranged to couple the L2 input line directly with the juncture of the first RUN winding 54-1 with the triac 200. The action of the switch 54-3 serves to shunt the heavy start-up current away from the triac during start-up in order to allow the triac 200 to be of smaller size and to be more reliable.

A transformer 230 produces low-voltage which is rectified by the bridge rectifier 232. The rectified 120 hertz power pulses couple through isolation diode 234 to charge a filter capacitor 236-1 in the usual manner, resulting in a low voltage d.c. potential on the order of 15–18 volts which couples through ballast resistor 236-2 with the zener diode 238. The result is the d.c. voltage produced on line 62-2' is stabilized by the zener (to be about 12 volts).

The 120 hertz pulses appearing at the output of the bridge rectifier 232 couple through a resistor 242 with the base of NPN transistor 240. The result is pulsing of current flow through the collector circuit of the transistor, including the resistor 246 which couples with the d.c. power. 120-hertz LINE SYNCH, pulses are resultingly produced on line 190'.

Figure 8:
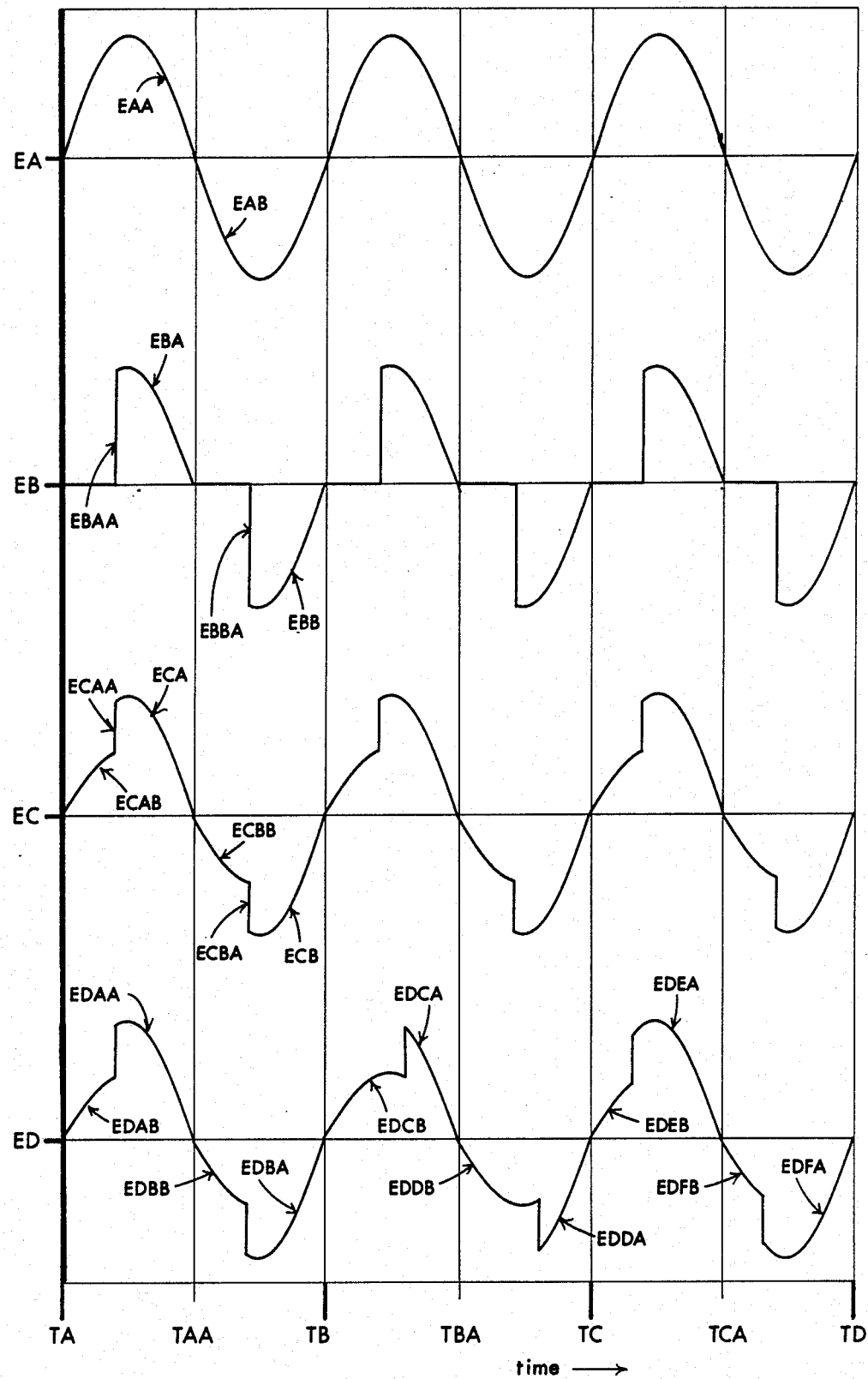
FIG. 8 A.c. power cycle waveforms for several control conditions.

In FIG. 8 I show the typical sine-wave a.c. power cycle EA having the usual two symmetrical half-cycles EAA, EAB. Waveform EB depicts the delayed turn-ON power cycle typical of prior art controllers, such as that of my mentioned application Ser. No. 07/075,990 and also like that of U.S. Pat. No. 4,533,857 by Chang et al. You will note the delayed, abrupt power turn-ON EBAA, EBBA from an OFF state which occurs during each power half-cycle and which places a sudden load (e.g., high current) impulse on the a.c. line during each half-cycle.

The valuable improvement afforded by the practice of my instant invention is well shown by the waveform curves EC of FIG. 8. Moderate first RUN winding current draw ECAB, ECBB occurs during the first portion of each half-cycle, prior to the abrupt turn-ON of the thyristor switch ECAA, ECBA, whereupon the additional current draw of the second RUN winding increases the overall current draw to a higher value ECA, ECB where it remains for the rest of each half-cycle. The improvement is found in the relatively smaller current change between the early portion ECAB, ECBB and the later portion ECA, ECB of each half-cycle. The meaningful result is a lessening of the magnitude of any current change reflected into the a.c. power line.

The waveforms ED of FIG. 8 show the integral cycle modulation of a succession of power cycles. The first cycle includes the first RUN winding excitation current EDAB, EDBB portion followed by the ON-switched second RUN winding portion (as combined with the first RUN winding current draw) EDAA, EDBA which correspond with the waveform value of the earlier mentioned waveforms EC. The next ED waveforms show power "modulation" produced by my controller, wherein the turn-ON delay is increased and less second RUN winding power is obtained as shown by the higher current waveform portions EDCA, EDDA which follow the lesser current portions EDCB, EDDB. The next (third) cycle shows increased second RUN winding power, wherein the higher current portion EDEA, EDFA is turned ON earlier in each half-cycle, changing the relationship with the lesser current portions EDEB, EDFB of each half-cycle.

Figure 9:
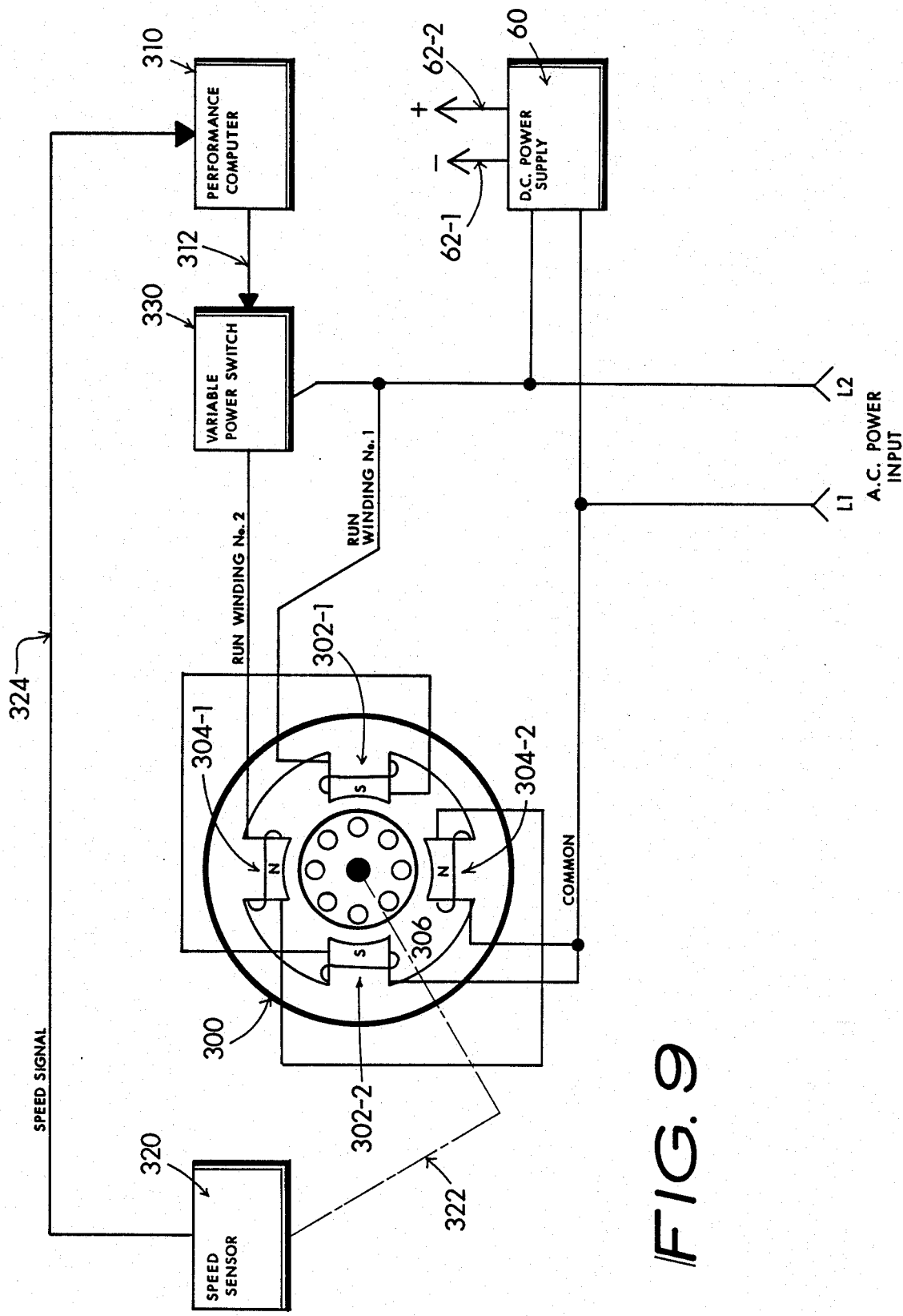
FIG. 9 Four-pole induction motor of conventional design, whereby two poles are constantly excited by the line power, and the other two poles are variably excited in response to any sensed changes in motor loading.

A common 4-pole induction motor may be used to at least demonstrate the essence of my invention when hooked-up like shown in FIG. 9. Two RUN winding coil sets 302-1, 302-2 are connected directly across the a.c. line terminals L1, L2 thus being permanently excited. Connection phase is such that they produce like poles in the stator. The second RUN winding coil sets 304-1, 304-2 connect between the line terminal L1 and the variable power switch 330. For mere purpose of experimentation, a Westinghouse type 316P293 or Emerson Electric model 5770 may be modified. These four pole, 230 volt motors are equipped with four RUN winding coils which are all series connected. By separating the coils and hooking them in pairs for each the first RUN and the second RUN winding coil sets, the diagrammatical hookup of FIG. 9 is satisfied. In addition, the four START windings intrinsic with each of these motors may be rewired to be two pairs of winding coils, whereby each pair is hooked in series, and the pair sets are hooked in parallel to effect proper operation from a 115 volt a.c. line. The performance computer 310, which may include circuits similar to those taught in FIG. 4, produces trigger pulses on line 312 which serve to control the switch 330. A speed sensor 320, which is suitably coupled 322 with the rotor 306 of the motor 300 produces speed signal pulses on line 324 which gives motor speed information to the computer 310 circuits. When the motor slows down due to loading, the excitation fed to the second RUN winding coils 304-1, 304-2 acts to supplement the fields produced by the first RUN winding coils 302-1, 302-2. The enhanced field increases motor torque and, as the load-resistance is overcome, the motor will normally speed-up.

Figure 10:
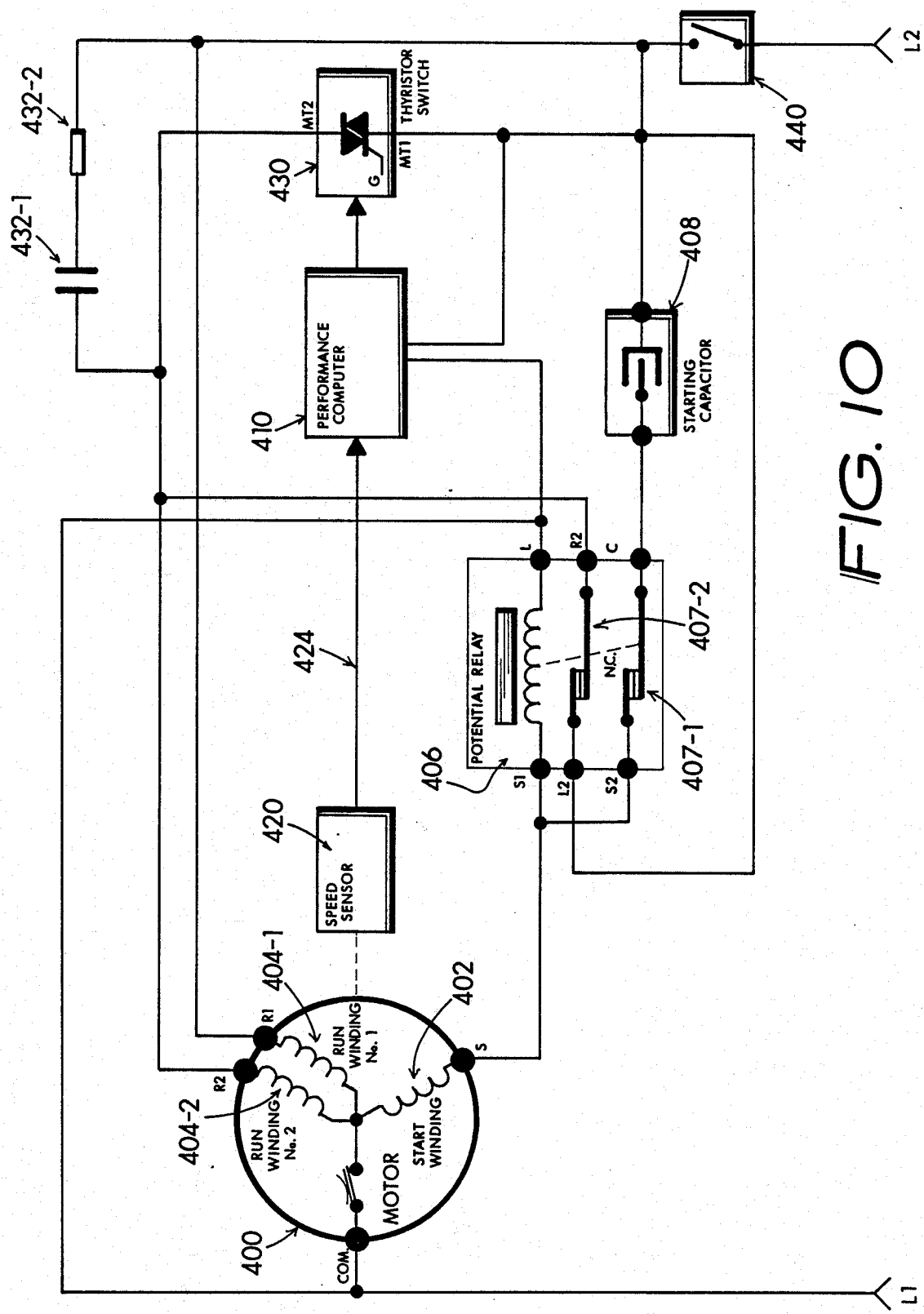
FIG. 10 Electrical diagram for a typical window air-conditioner wherein the hermetic motor/compressor unit is provided with an additional RUN winding to attain energy conservation through load-responsive a.c. power control.

A refrigeration system commonly includes an induction motor driven compressor 400 hooked up such as depicted in FIG. 10. The motor is of ordinary design, except that it is provided with two parallel RUN windings 404-1, 404-2, in addition to the usual START winding 402. As is usual practice, a potential relay 406 includes a set of contacts 407-1 which handles the start-up currents for the motor START winding 402, which may also connect with a motor starting capacitor 408. The potential relay 406 also includes an additional contact set 407-2 which shunts the heavy start-up current which may be initially drawn by the second RUN winding 404-2 around the thyristor switch 430 thereby protecting the thyristor from having to deal with such abusive current. A performance computer 410, which may follow the design concepts of FIG. 4, serves to accept speed pulses produced by the speed sensor 420 on signal line 424, whereby the speed pulses reflect the speed of the motor as coupled 422 from the motor. The thyristor switch is shunted with snubber circuitry, including capacitor 432-1 and resistor 432-2. A thermostat or other controlling device 440 may also be used to shut the overall circuit ON and OFF.

Figure 11:
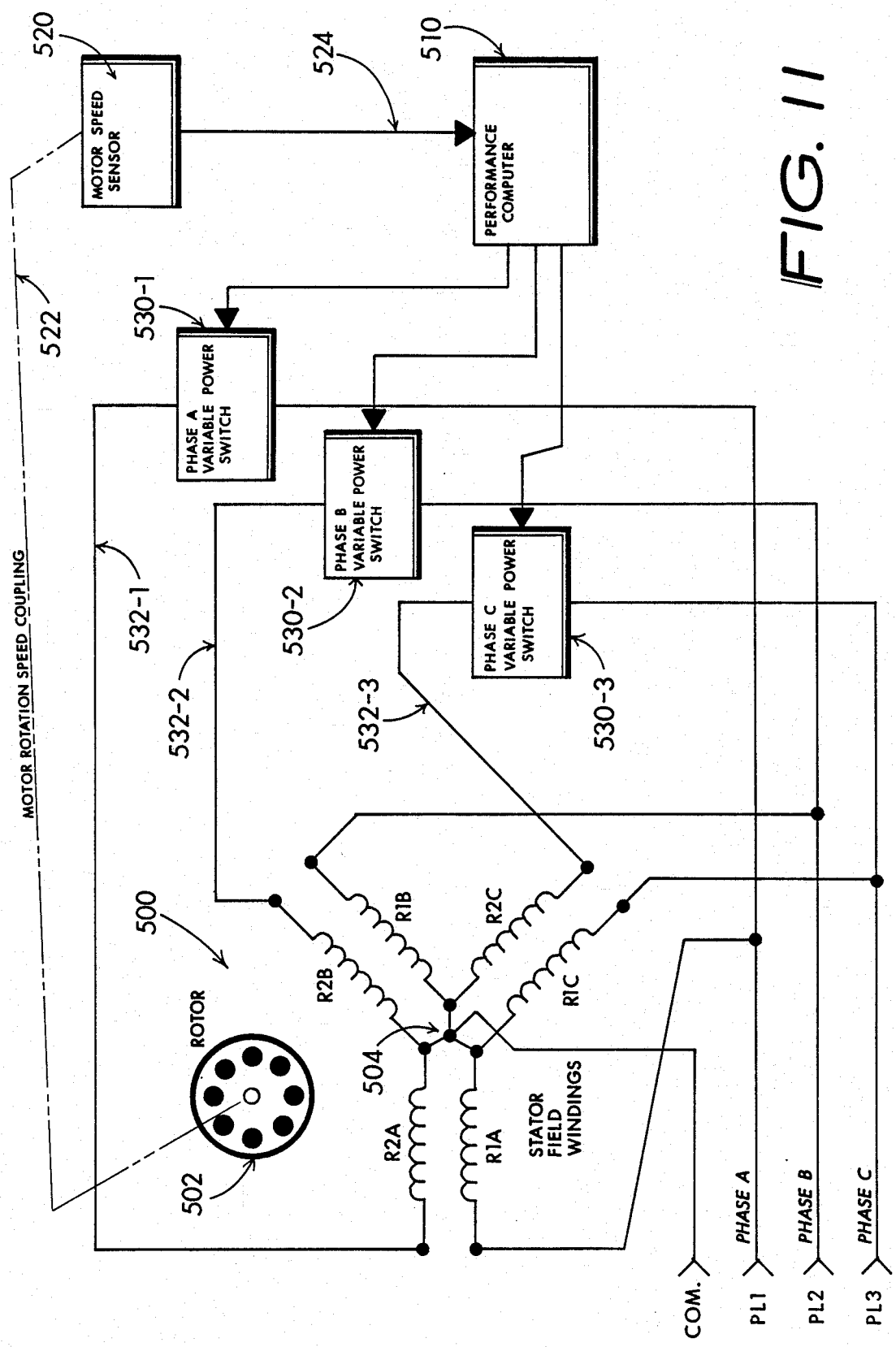
FIG. 11 Three phase motor is shown to have separate pairs of RUN windings for each phase leg in order to obtain reduction of light-load power consumption.

Three phase motors may just as well be made more energy efficient through application of my invention. In FIG. 11 I generally show a three phase motor 500, which includes a rotor 502 that is excited by three pairs of wye-connected RUN windings which commonly connect together at the neutral juncture 504. The speed of the rotor 502 couples 522 with the motor speed sensor 520, producing speed pulses which couple 524 with the performance computer 510. The output of the computer 510 circuits feeds trigger signals to each of the three variable power switches 530-1, 530-2, 530-3. Each of the RUN windings R1A, R1B, R1C connect directly with the three input power lines PL1, PL2, PL3. The phase A power controlled by switch 530-1 connects 532-1 with the phase A second RUN winding R2A. In a like way, the phase B and phase C power controlled by switches 530-2 and 530-3 connect with the second RUN windings R2B and R2C. Overall operation is similar to the single-phase application of my invention, as explained in FIG. 1.

Figure 12:
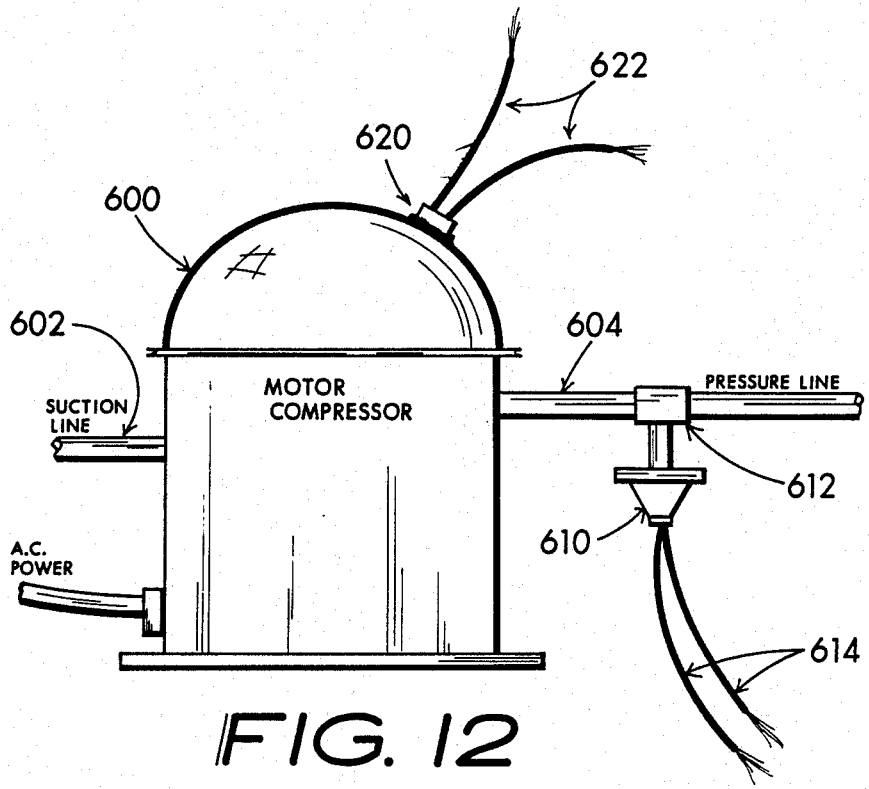
FIG. 12 Hermetic motor/compressor of the sort used with common refrigerators and air-conditioners, showing connection of compression impulse sensors to obtain motor speed sensing.

A hermetically sealed motor-compressor 600 such as commonly used in refrigerators and air-conditioners is shown in FIG. 12. The sealed unit includes a suction line and a pressure line 604. What I have done is to include a pressure responsive sensor 610 attached 612 to the pressure line and arranged to produce signals on the output leads 614 in response to the compression impulses produced by the compressor. The frequency of these impulse signals are proportional to motor speed and may be used by the artisan to provide the speed signal information to the performance computer such as taught in FIG. 10. I also depict an alternative hookup for sensing compression frequency through the use of a vibration sensor 620 affixed to the motor-compressor housing. The resulting signal produced on the leads 622 may serve to give speed information to the performance computer 410 of FIG. 10.

The choice of other circuit details, hardware kind, or operating levels as well as the engineered characteristics of the induction motor is merely within the scope of the usual variation which might be implemented by any person skilled in the art and shall not be construed as producing departure from the essential teachings provided by the invention. It is anticipated that any clever artisan can develop a number of different approaches to obtain results comparable to mine, but that such differences in detail do not substantially detract from the novelty of my invention.

You will find that the essence of my invention has been revealed in the drawings and the attendant description through the use of a particular set of hardware devices which lend themselves to clear, readily understood signal paths. The use of microprocessor controlled circuitry and other types of sensors and power switching devices hooked up to satisfy the essence of my invention's claims is anticipated to be within the scope of my invention and merely an obvious alternative implementation which may be undertaken by a suitably skilled artisan.

What I claim is:

1. Power control method for use with an electric induction motor, comprising the steps of:
   providing a source of alternating current power;
   providing the induction motor with a first RUN winding predetermined to produce a first partial level of motor field excitation when effectively coupled with the a.c. power source;
   providing the induction motor with a second RUN winding predetermined to produce a second partial level of motor field excitation when effectively coupled with the a.c. power source;
   combining the partial levels of motor field excitation to produce a full level of motor field excitation;
   coupling the first RUN winding with the source of a.c. power;
   driving an inconstant mechanical load with the induction motor;
   predetermining a value of subsynchronous full load driving speed for the induction motor;
   sensing instant motor speed;
   variably coupling a.c. current power flow between the source and the second RUN winding;
   increasing the variable coupling relative with any sensed speed decrease below the predetermined load driving speed; and,
   decreasing the variable coupling relative with any sensed speed increase above the predetermined load driving speed.

2. Power control method of claim 1 comprising the further steps of:
   predetermining the minimum value for the motor driven mechanical load; and, configuring the first RUN winding to provide sufficient motor field excitation to enable the motor to drive the minimum load.

3. Power control method of claim 2 comprising the further steps of:
   predetermining the maximum value for the motor driven mechanical load; and,
   configuring the second RUN winding to provide sufficient motor field excitation when combined with the first RUN winding field excitation to enable the motor to drive the maximum load.

4. Power control method of claim 1 comprising the further step of:
   determining the subsynchronous full load driving speed to preferably be not more than about 96% that of essentially synchronous motor speed.

5. Power control method of claim 1 comprising the further step of:
   controlling the variation in the coupling of a.c. power between the source and the second RUN winding through phase angle delayed switching action of a thyristor thereby enabling a variously delayed portion of each a.c. power cycle to be coupled with the second RUN winding.

6. Power control method of claim 1 comprising the further step of:
   providing said mechanical load as a refrigerant compressor;
   sensing frequency of compression impulses produced by said refrigerant compressor; and,
   determining effective motor speed as a derivative of said sensed frequency.

7. Power control method of claim 1 comprising the further steps of:
   providing the mechanical load as a compressor;
   sensing the compression impulses produced by the compressor;
   determining the impulse frequency of the compression impulses; and,
   deriving instant motor speed from the impulse frequency.

8. Power control apparatus for use with an electric induction motor, comprising:
   source of alternating current electric power;
   induction motor means including:
      first RUN winding means predetermined to produce a first partial level of motor field excitation;
      second RUN winding means predetermined to produce a second partial level of motor field excitation;
      means for combining said first partial field excitation and said second partial field excitation to produce a FULL level of motor field excitation;
   inconstant load means coupled with said motor means;
   means for coupling substantially full a.c. electric power between the source and the first RUN winding means;
   means for producing variable a.c. electric power coupling between the source and the second RUN winding means;
   means for sensing motor speed; and,
   means coupled with motor speed sensing means and said variable a.c. electric power coupling means, effective to produce an increase in the coupling of electric power between the source and the second RUN winding means whenever the sensed motor speed slips below a predetermined speed value.

9. Power control apparatus of claim 8 further including means for starting the motor comprising:
   START winding means;
   means for initially coupling the START winding with the a.c. power source; and,
   means for decoupling the START winding from the a.c. power source whenever the motor has attained substantial speed.

10. Power control apparatus of claim 8 further comprising:
   means for coupling about full a.c. electric power between the source and the second RUN winding whenever the START winding is coupled with the a.c. power source.

11. Power control apparatus of claim 8 wherein:
   said inconstant load means comprises refrigeration compressor means;
   said motor speed sensing means comprises compression frequency sensing means coupled with said compressor means and includes means for deriving effective motor speed from the sensed frequency.

12. Power control apparatus of claim 8 wherein:
   said first RUN winding comprises a sufficient number of turns of wire of predetermined guage to induce a first magnetic field of sufficient flux density to produce about the motor output member torque necessary for driving a least value of the inconstant load; and,
   said second RUN winding comprises a sufficient number of turns of wire of predetermined guage to induce a second magnetic field flux density which combines with the first magnetic field produced by the first RUN winding to produce about the motor output member torque necessary for driving any increased value of inconstant load.

13. Power control apparatus of claim 8 wherein said variable power coupling means comprises thyristor means coupled effectively between the power source and the second RUN winding means.

14. Induction motor power control means comprising:
   alternating current power source;
   induction motor means including:
      first RUN winding means;
      second RUN winding means;
      means for combining any magnetic field excitation produced by said first RUN winding means and said second RUN winding means;
      means for producing rotation of an output member;
   means for coupling an inconstant load means with the output member;
   means for coupling said first RUN winding means with said source;
   means for effectively sensing rotational speed of the output member;
   means for variably coupling said second RUN winding means with said source; and,
   means coupled with said sensing means and said variable coupling means whereby the variable coupling effectively increases for any decrease in sensed speed below a predetermined value.

15. Power control means of claim 14 further comprising:
   said motor means having START winding means;
   means for coupling said START winding means with said a.c. power source when the motor speed is less than substantial operating speed; and,
   means for decoupling said START winding means from said source when the motor has attained substantial operating speed.

16. Power control means of claim 15 further comprising:
   means for coupling the second RUN winding effectively with the full a.c. power source when the motor speed is less than substantial operating speed.

17. Power control means of claim 14 wherein:
   said inconstant load means comprises refrigeration compressor means;
   said means for sensing rotational speed comprises compression impulse frequency sensing means coupled with said compressor means and effective therewith to derive the effective rotational speed from the impulse frequency.

18. Power control means of claim 14 wherein said variable coupling means comprises thyristor means effective for coupling various portions of half-cycle a.c. power flow between the a.c. source and the second RUN winding.

19. Power control means of claim 18 having integral power cycle symmetry in which both half-cycles of any acted-upon full power cycle have about the same portion of ON time.

20. Power control means of claim 14 wherein said rotational speed sensing means comprises pulse signal producing means coupled with said output member.

* * * * *